United States Patent
Neef et al.

(10) Patent No.: US 6,872,506 B2
(45) Date of Patent: Mar. 29, 2005

(54) WET-DEVELOPABLE ANTI-REFLECTIVE COMPOSITIONS

(75) Inventors: Charles J. Neef, Rolla, MO (US); Vandana Krishnamurthy, Rolla, MO (US)

(73) Assignee: Brewer Science Inc., Rolla, MO (US)

( * ) Notice: Subject to any disclaimer, the term of this patent is extended or adjusted under 35 U.S.C. 154(b) by 0 days.

(21) Appl. No.: 10/601,897

(22) Filed: Jun. 23, 2003

(65) Prior Publication Data

US 2004/0058275 A1 Mar. 25, 2004

Related U.S. Application Data

(60) Provisional application No. 60/391,661, filed on Jun. 25, 2002.

(51) Int. Cl.$^7$ .............................. G03F 7/004; G03C 5/00
(52) U.S. Cl. .................... 430/271.1; 430/325; 430/905; 430/272.1
(58) Field of Search .............................. 430/271.1, 326, 430/905, 272.1, 325, 926

(56) References Cited

U.S. PATENT DOCUMENTS

| | | | |
|---|---|---|---|
| 4,244,799 A | 1/1981 | Fraser et al. | |
| 4,369,090 A | 1/1983 | Wilson et al. | |
| 4,683,024 A | 7/1987 | Miller et al. | |
| 4,732,841 A | 3/1988 | Radigan | |
| 4,738,916 A | 4/1988 | Namatsu et al. | |
| 4,891,303 A | 1/1990 | Garza et al. | |
| 4,910,122 A | 3/1990 | Arnold et al. | |
| 5,126,231 A | 6/1992 | Levy | |
| 5,370,969 A | 12/1994 | Vidusek | |
| 5,403,438 A | 4/1995 | Motoyama | |
| 5,542,971 A * | 8/1996 | Auslander et al. | ....... 106/31.15 |
| 5,632,910 A | 5/1997 | Nagayama et al. | |
| 5,925,578 A | 7/1999 | Bae | |
| 6,015,650 A | 1/2000 | Bae | |
| 6,136,511 A | 10/2000 | Reinberg et al. | |
| 6,156,665 A | 12/2000 | Hamm et al. | |
| 6,251,562 B1 * | 6/2001 | Breyta et al. | ............ 430/287.1 |
| 6,309,789 B1 | 10/2001 | Takano et al. | |
| 6,361,833 B1 | 3/2002 | Nakada et al. | |
| 6,380,611 B1 | 4/2002 | Yin et al. | |
| 6,487,879 B1 | 12/2002 | Blackwell et al. | |

FOREIGN PATENT DOCUMENTS

| | | |
|---|---|---|
| GB | 2288184 | 11/1995 |
| JP | 10149531 | 6/1998 |

OTHER PUBLICATIONS

Machine Assisted English translation for JP–10149531.

\* cited by examiner

*Primary Examiner*—Rosemary Ashton
(74) *Attorney, Agent, or Firm*—Hovey Williams, LLP

(57) ABSTRACT

Anti-reflective compositions and methods of using these compositions to form circuits are provided. The compositions comprise a polymer dissolved or dispersed in a solvent system. In a preferred embodiment, the polymers include a light-attenuating moiety having a structure selected from the group consisting of:

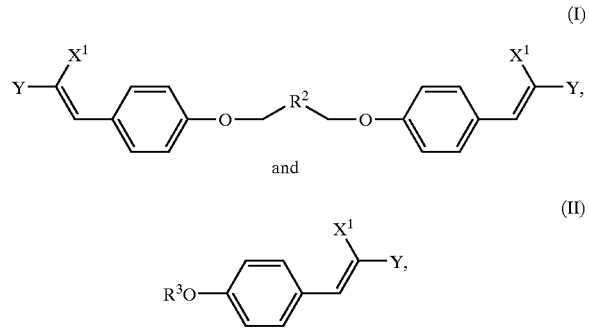

where:
- each of $X^1$ and Y is individually selected from the group consisting of electron withdrawing groups;
- $R^2$ is selected from the group consisting of alkyls and aryls; and
- $R^3$ is selected from the group consisting of hydrogen and alkyls.

The resulting compositions are spin bowl compatible (i.e., they do not crosslink prior to the bake stages of the microlithographic processes or during storage at room temperature), are wet developable, and have superior optical properties.

40 Claims, 3 Drawing Sheets

WET-DEVELOPABLE ANTI-REFLECTIVE COMPOSITIONS

RELATED APPLICATIONS

This application claims the priority benefit of a provisional application entitled WET-DEVELOPER ANTI-REFLECTIVE COMPOSITIONS, Ser. No. 60/391,661, filed Jun. 25, 2002, incorporated by reference herein.

BACKGROUND OF THE INVENTION

1. Field of the Invention

The present invention is concerned with new anti-reflective compositions for use in photolithographic and semi-conductor integrated circuit manufacturing. In particular, the compositions are used as bottom anti-reflective coatings located beneath a photoresist layer to minimize interference from the reflection of applied light radiation.

2. Description of the Prior Art

Integrated circuit manufacturers are consistently seeking to maximize substrate wafer sizes and minimize device feature dimensions in order to improve yield, reduce unit case, and increase on-chip computing power. As the critical dimensions of integrated circuits have decreased, the wavelength of the radiation used to expose photoresists has similarly shortened. The use of shorter wavelength radiation is necessary to define the very small features of a circuit, and typically so-called i-line radiation with a wavelength of 365 nm is now used. A consequence of the use of such radiation is an increasing reflection of the radiation at the interface of the photoresist layer and the underlying layer, giving rise to standing waves which can cause undesirable variations in the critical dimensions of circuit features.

One approach to address this problem is the use of an anti-reflective coating applied to the substrate beneath the photoresist layer. These can be divided into two classes—inorganic and organic. Inorganic coatings, such as titanium nitride or silicon oxynitride coatings, can be deposited easily by plasma-enhanced chemical vapor deposition but can be difficult to remove from a silicon wafer substrate. In contrast, organic coatings are advantageous in terms of refractive index, spin-on application, and rework capabilities but often suffer from spin bowl incompatibility, thus requiring additional processing and increased manufacturing costs. While both organic and inorganic anti-reflective coatings are effective at preventing or minimizing reflection, their use requires an additional break-through step in the process in order to remove the coatings. Typically, an additional plasma etch step is then required which can further significantly increase the cost of the manufacturing process.

One solution to this problem has been the use of wet developable anti-reflective coatings. These types of coatings can be removed along with the exposed areas of the photoresist material. That is, after the photoresist layer is exposed to light through a patterned mask, the exposed areas of the photoresist are wet developable and are subsequently removed with an aqueous developer to leave behind the desired trench and hole pattern. Wet developable anti-reflective coatings are removed during this developing step, thus eliminating the need for an additional removal step. Unfortunately, wet developable anti-reflective coatings have not seen widespread use due to the fact that they must also exhibit good spin bowl compatibility and superior optical properties to be useful as an anti-reflective coating. Thus, there is a need for anti-reflective coating compositions which are developable in conventional photoresist developers while simultaneously exhibiting good coating and optical properties and being spin bowl compatible.

SUMMARY OF THE INVENTION

The present invention broadly comprises novel anti-reflective coating compositions that are spin bowl compatible, wet etchable, and suitable for use in i-line lithography (e.g., 365 nm).

In more detail, the compositions comprise a polymer dispersed or dissolved in a solvent system. The polymer preferably has a weight average molecular weight of from about 500–10,000 Daltons, and more preferably from about 1,000–2,000. Preferred polymers include recurring units having the formula

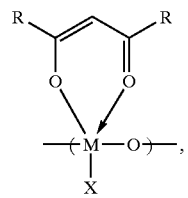

wherein X is a light-attenuating moiety or chromophore, M is a metal, and each R is individually selected from the group consisting of hydrogen, alkyls (preferably $C_1-C_8$), aryls (preferably $C_1-C_{10}$), alkoxys (preferably $C_1-C_8$), and phenoxys. The most preferred R groups are —$CH_3$ and —$OC_2H_5$.

The polymer preferably further comprises recurring units having the formula

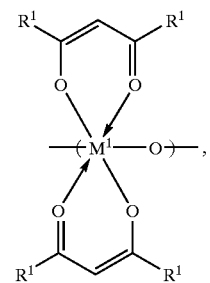

where each $R^1$ is individually selected from the group consisting of hydrogen, alkyls (preferably $C_1-C_8$), aryls (preferably $C_1-C_{10}$), alkoxys (preferably $C_1-C_8$), and phenoxys, and $M^1$ is a metal. The most preferred $R^1$ groups are —$CH_3$ and —$OC_2H_5$.

With either of the foregoing recurring units, the most preferred metals are Ti, Zr, Si, and/or Al. X should have a molar extinction or molar absorption coefficient of from about 10,000–50,000 $cm^{-1}M^{-1}$, and more preferably from about 15,000–25,000 $cm^{-1}M^{-1}$. Preferred X groups are any i-line chromophores (i.e., those which absorb at least about 90% of light having a wavelength of about 365 nm), with those having a structure selected from the group consisting of Formula I and Formula II being particularly preferred.

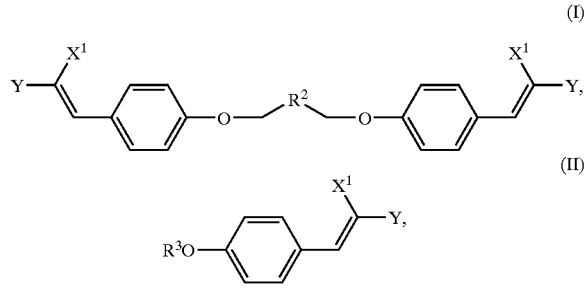

where:

each of $X^1$ and Y is individually selected from the group consisting of electron withdrawing groups (EWG), with carbonyls, nitrites, cyanics, sulfones, and —$CO_2R^4$ (where $R^4$ is an alkyl and preferably a $C_1$–$C_6$ alkyl) being particularly preferred EWG.; and $R^2$ is selected from the group consisting of alkyls (preferably $C_1$–$C_8$) and aryls (preferably $C_1$–$C_{10}$).

$R^3$ is selected from the group consisting of hydrogen and alkyls (preferably $C_1$–$C_4$).

Furthermore, the moiety (i.e., X) is preferably present in the polymer at a level of from about 5–50% by weight, and more preferably from about 20–30% by weight, based upon the total weight of the polymer taken as 100% by weight.

In another embodiment, the polymer is formed by reacting a polymeric metal alkoxide with an organic compound and a chromophore as defined above. The polymeric metal alkoxide includes recurring units having the formula

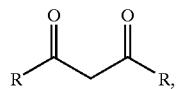

(III)

where M is a metal, and each L is individually selected from the group consisting of diketo and alkoxide ligands. Preferred L groups have the formula

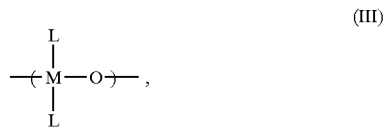

where each R is individually selected from the group consisting of hydrogen, alkyls (preferably $C_1$–$C_8$), aryls (preferably $C_1$–$C_{10}$), alkoxys (preferably $C_1$–$C_8$), and phenoxys, with —$CH_3$ and —$OC_2H_5$ being the most preferred R groups. A moiety of ethyl acetoacetate is the most preferred L group. The preferred metal atoms are the same as those discussed previously.

In this embodiment, the polymeric metal alkoxide having the structure of Formula III above can first be formed by reacting a polymeric metal alkoxide (e.g., poly(dibutyltitanate)) with a diketo or alkoxide ligand (e.g., ethyl acetoacetate). Alternately, a starting monomer which already includes the diketo or alkoxide ligand as part of its structure can be formed into the desired polymer by hydrolyzing and then condensing the monomer. One example of this type of starting monomer is titanium diisopropoxide bis (ethylacetoacetate).

The organic compound which is reacted with the polymeric metal alkoxide having the structure of Formula III above should comprise a functional group suitable for coordinating with the metal atom of the polymeric metal alkoxide. Suitable functional groups include alcohols, phenols, thioalcohols, thiophenols, and carbonyls. The most preferred organic compounds are trimethylol ethoxylate, 4-hydroxybenzaldehyde, and 2-cyano-3-(4-hydroxyphenyl)-acrylic acid ethyl ester.

Regardless of the embodiment, the anti-reflective compositions are formed by simply dispersing or dissolving the polymers in a suitable solvent system, preferably at ambient conditions and for a sufficient amount of time to form a substantially homogeneous dispersion. The polymer should be present in the composition at a level of 2–50% by weight, more preferably from about 5–30% by weight, and more preferably from about 7–15% by weight, based upon the total weight of solids in the composition taken as 100% by weight. The viscosity of this polymer is preferably from about 2,000–5,000 cS, and more preferably from about 3,200–3,500 cS.

Preferred solvent systems include a solvent selected from the group consisting of propylene glycol methyl ether acetate (PGMEA), propylene glycol methyl ether (PGME), propylene glycol n-propyl ether (PnP), ethyl lactate, and mixtures thereof. Preferably, the solvent system has a boiling point of from about 50–250° C., and more preferably from about 100–175° C. The solvent system should be utilized at a level of from about 70–95% by weight, and preferably from about 80–90% by weight, based upon the total weight of the solids in the composition taken as 100% by weight.

Any additional ingredients are also preferably dispersed in the solvent system along with the polymer. One such preferred additional ingredient is a second polymer or polymer binder such as those selected from the group consisting of epoxy novolac resins (e.g., Epon 164®, available from Araldite), polymerized aminoplasts (e.g., Cymel® products available from Cytec Industries), acrylates, glycourils, vinyl ethers, and mixtures thereof. The weight average molecular weight of this additional polymer is preferably from about 1,000–25,000 Daltons, and more preferably from about 1,000–5,000 Daltons. In embodiments where an additional polymer is utilized, the composition should comprise from about 1–50% by weight of this additional polymer, and more preferably from about 5–25% by weight, based upon the total weight of the solids in the composition taken as 100% by weight.

It will be appreciated that a number of other optional ingredients can be included in the composition as well. Typical optional ingredients include light attenuating compounds, surfactants, catalyst, crosslinkers, and adhesion promoters.

The method of applying the fill or anti-reflective coating compositions to a substrate simply comprises applying a quantity of a composition hereof to the substrate surface by any known application method (including spin-coating). The substrate can be any conventional circuit substrate, e.g., silicon, aluminum, tungsten, tungsten silicide, gallium arsenide, germanium, tantalum, tantalum nitrite, mixed metal salts, and SiGe.

After the desired coverage is achieved, the resulting layer should be heated to a temperature of from about 100–250° C. to induce crosslinking. This will result in the evaporation of the solvent system as well as the volatilization of at least a portion of the organic constituents of the composition to yield a cured layer having alternating metal and oxygen atoms. The refractive index (n value) of this cured anti-reflective layer or coating will be at least about 1.4, preferably from about 1.5–2.0, and more preferably from about 1.6–1.7 at a wavelength of about 365 nm.

When used on topographical substrates, the thickness of the cured layer on the surface of the substrate adjacent the edge of a contact or via hole should be at least about 60%, preferably at least about 75%, and more preferably at least about 85% of the thickness of the film on the substrate surface a distance away from the edge of the contact or via hole approximately equal to the diameter of the hole.

A photoresist can be applied to the cured material, followed by exposing, developing, and etching of the photoresist. Following the methods of the invention will yield precursor structures for dual damascene and other microlithographic processes which have the foregoing desirable properties.

It will further be appreciated that the cured inventive compositions are wet developable. That is, the cured compositions can be removed with conventional aqueous developers such as tetramethyl ammonium hydroxide and KOH developers. Some of these developers are commercialized under the tradenames MF-319 (available from Shipley, Massachusetts), MF-320 (available from Shipley), and NMD3 (available from TOK, Japan) developers. At least about 95%, and preferably at least about 99% of the inventive coatings will be removed by a base developer such as tetramethyl ammonium hydroxide and KOH developers. This percent solubility in commercially-available developers is a significant advantage over the prior art as this shortens the manufacturing process and makes it less costly.

Finally, in addition to the many advantages described above, the present composition is spin bowl compatible. This is determined by coating a four-inch silicon wafer with the composition. After coating, the wafer is not baked, but is instead positioned upward in order to prevent film flow. The sample is allowed to dry for about 24 hours in a cleanroom to yield a film around 1200–1300 Å thick. The sample thickness is then measured at five locations to determine the average initial sample thickness.

The coated wafer is exposed to the particular test solvent (e.g., propylene glycol methyl ether acetate). This is accomplished by flooding the sample surface with the solvent for three minutes (±five seconds) followed by spinning for 15 seconds at 1,500 rpm and then for 30 seconds at 2500 rpm. The thickness of the sample is again measured at five locations, and the average final sample thickness is determined.

The percent solubility is calculated as follows:

$$\% \text{ solubility} = \left[ \frac{(\text{ave. initial sample thickness} - \text{ave. final sample thickness})}{(\text{ave. initial sample thickness})} \right] * 100.$$

The inventive compositions yield a percent solubility of at least about 75%, preferably at least about 90%, and more preferably at least about 95%.

DETAILED DESCRIPTION OF THE PREFERRED EMBODIMENTS

EXAMPLES

The following examples set forth preferred methods in accordance with the invention. It is to be understood, however, that these examples are provided by way of illustration and nothing therein should be taken as a limitation upon the overall scope of the invention.

Example 1

Preparation of Polymer Mother Liquor

In this example, a polymer mother liquor was prepared by dissolving 2 molar equivalents of diketo ligand (ethylacetoacetate) per repeat unit of poly(dibutyltitanate) in 62.0 g of propylene glycol n-propyl ether. The reaction mixture was stirred for 6 hours, thus converting the poly (dibutyltitanate) to a poly(titanate) polymer with two diketo ligands attached to the titanium atom.

Example 2

Preparation of Anti-Reflective Coating

In this procedure, 50.0 g of the polymer mother liquor prepared in Example 1, 2.53 g of XS81 chromophore (an i-line chromophore, see Structure A; made by Brewer Science, Inc.), and 47.5 g of propylene glycol n-propyl ether were added to a reaction vessel and stirred for 4 hours until a solution was formed. The resulting formulation was then filtered through a 0.1 μm polytetrafluoroethylene (PTFE) filter prior to use.

Structure A

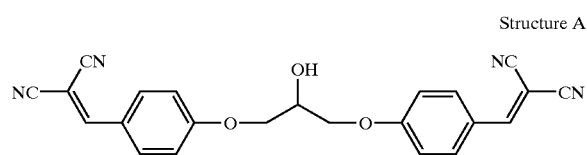

Example 3

Preparation of Anti-Reflective Coating

In this procedure, 50.0 g of the polymer mother liquor prepared in Example 1, 2.53 g of CE chromophore (an i-line chromophore, see Structure B; made by Brewer Science, Inc.), 1.87 of an aminoplast crosslinker (CYMEL®, obtained from Cytec Industries), and 47.5 g of propylene glycol n-propyl ether were added to a reaction vessel and stirred for 4 hours until a solution was formed. The resulting formulation was then filtered through a 0.1 μm polytetrafluoroethylene (PTFE) filter prior to use.

Structure B

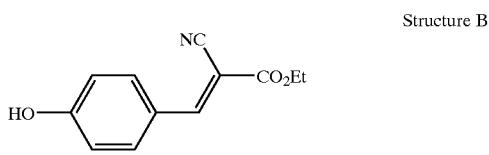

Example 4

Determination of Properties

1. Stripping Test

The compositions from Examples 2 and 3 were individually spin-coated onto a silicon wafer at 3000 rpm for 60 seconds and baked on hot plates at temperatures ranging from 168–250° C. The film thicknesses were measured via ellipsometry after which the films were exposed to typical photoresist solvents (ethyl lactate and PGMEA). The baked films exhibited very low solubility in the solvents, suggesting that little or no intermixing at the photoresist/anti-reflective coating interface had occurred.

2. Optical Properties

Figure 1:
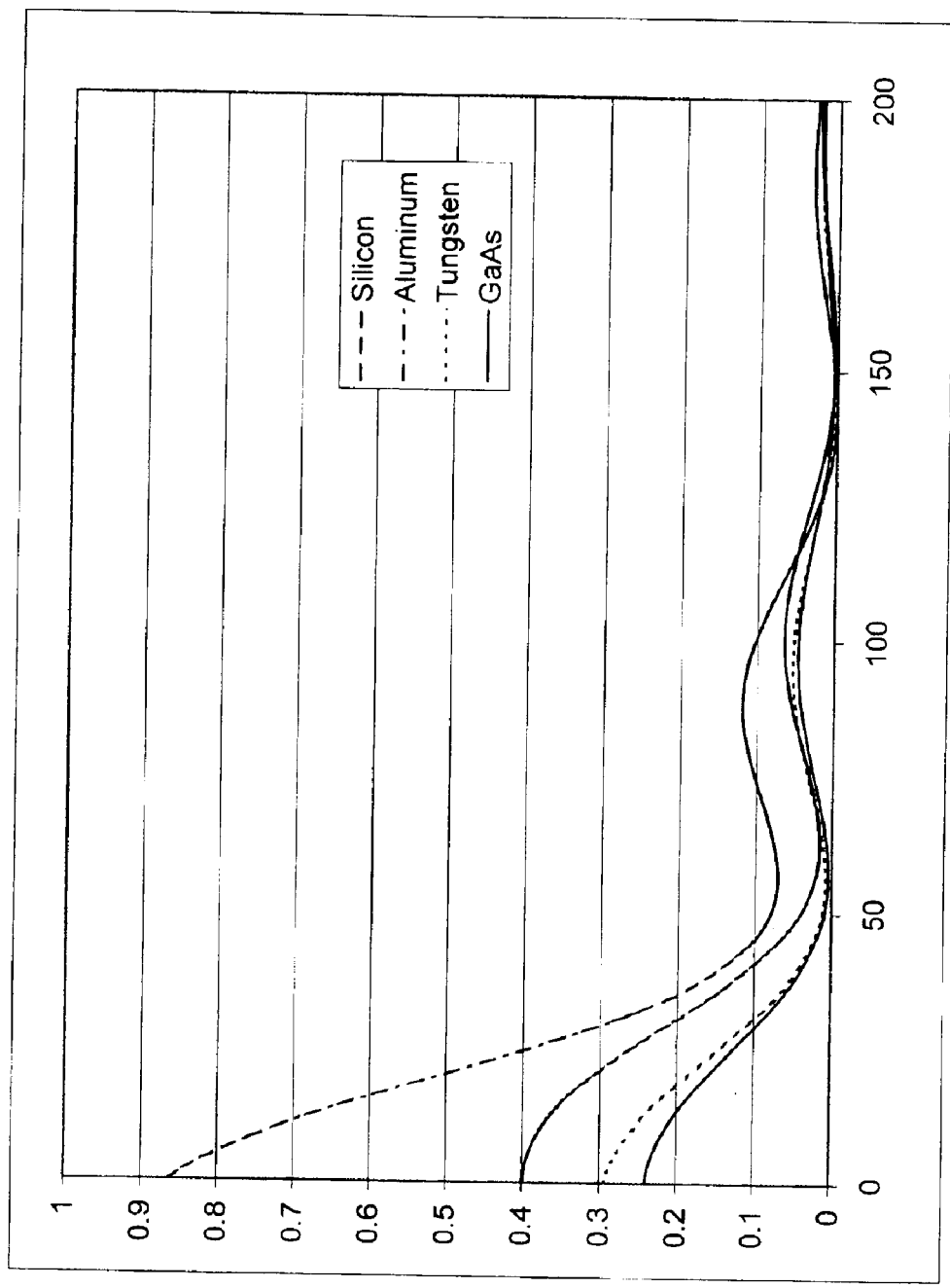
FIG. 1 is a graph showing the reflectivity curve of the inventive cured anti-reflective coating prepared according to Example 2 when applied to various substrates.
Figure 2:
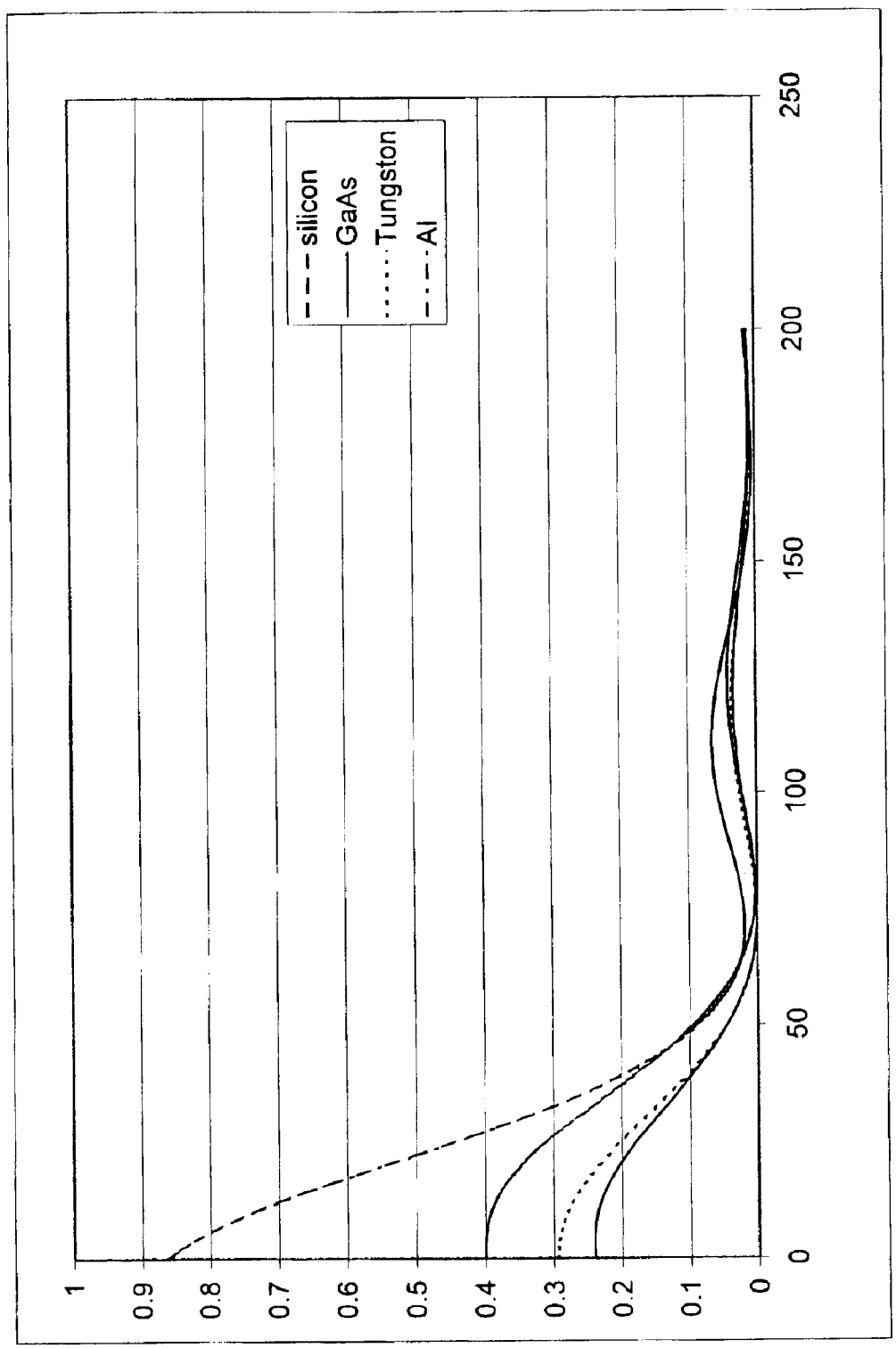
FIG. 2 is a graph showing the reflectivity curve of the inventive cured anti-reflective coating prepared according to Example 3 when applied to various substrates.

After baking at 250° C. for 60 seconds, the composition of Example 2 had an n value (refractive index) of 1.9339 and a k value (absorption coefficient) of 0.40. After baking at 250° C. for 60 seconds, the composition of Example 3 had an n value of 1.6948 and a k value of 0.458. FIGS. 1 and 2 show the reflectivity curves for the Examples 2 and 3 compositions, respectively.

3. Photolithography

Figure 3:
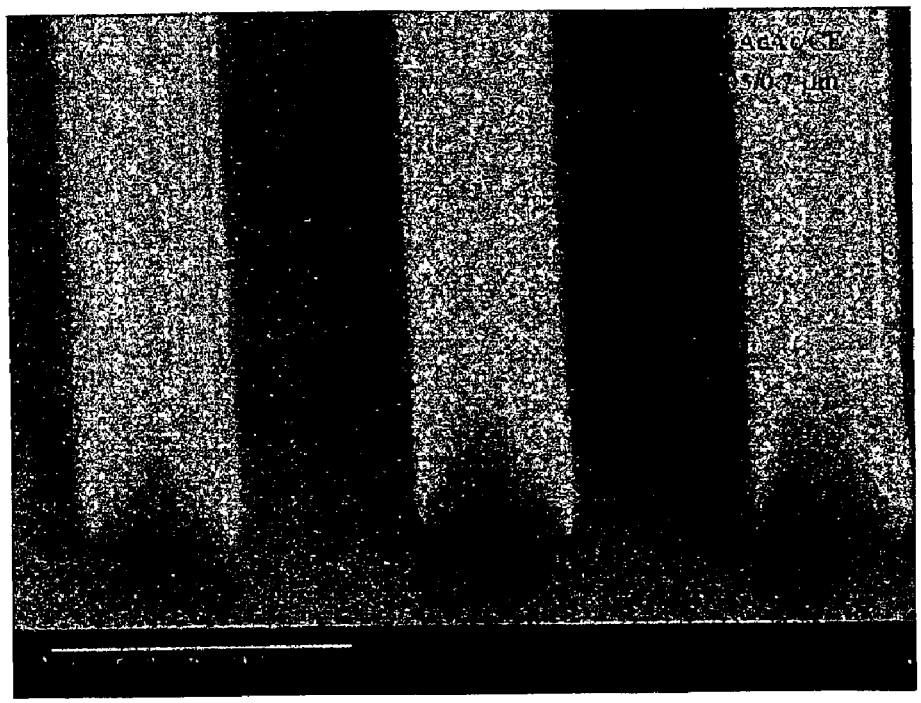
FIG. 3 is a scanning electron microscope (SEM) photograph showing the profile of the inventive cured anti-reflective coating prepared according to Example 2 and a commercially available, i-line photoresist.
Figure 4:
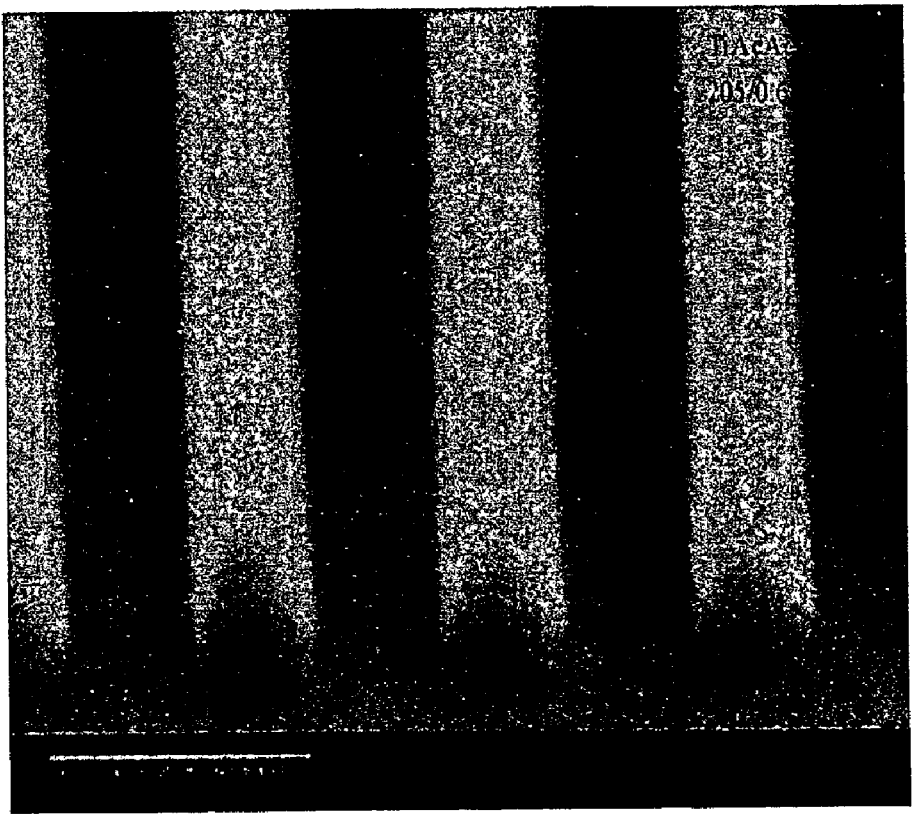
FIG. 4 is an SEM photograph showing the profile of the inventive cured anti-reflective coating prepared according to Example 3 and a commercially available, i-line photoresist.

The formulations exhibited resolution of 0.6 μm lines with the i-line photoresist OiR620 (available from ARCH Chemical) using a Nikon i-line stepper (0.50 numerical aperture). The top down profiles of the compositions of Examples 1 and 2 are shown in FIGS. 3 and 4, respectively.

4. Spin Bowl Compatibility

Films prepared from the composition of Example 3 were tested for their spin bowl compatibility following the procedure described previously. Compositions were considered to be spin bowl compatible if they had a percent solubility of at least about 90%. The results of these tests are set forth in Table A.

TABLE A

| Example No. | Solvent | Thickness before strip, Å | Thickness after strip, Å | % solubility | Spin Bowl Compatible |
|---|---|---|---|---|---|
| 2 | PGMEA | 1273 | 31 | 97.56 | yes |
| 2 | Ethyl lactate | 1277 | 21 | 98.35 | yes |
| 2 | Heptanone | 1276 | 48 | 96.24 | yes |

We claim:

1. An anti-reflective coating composition comprising:

a solvent system; and a polymer dispersed or dissolved in said solvent system, said polymer including recurring units having the formula

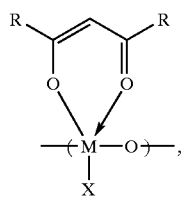

wherein:

M is a metal;

each R is individually selected from the group consisting of hydrogen, alkyls, aryls, alkoxys, and phenoxys; and X is selected from the group consisting of

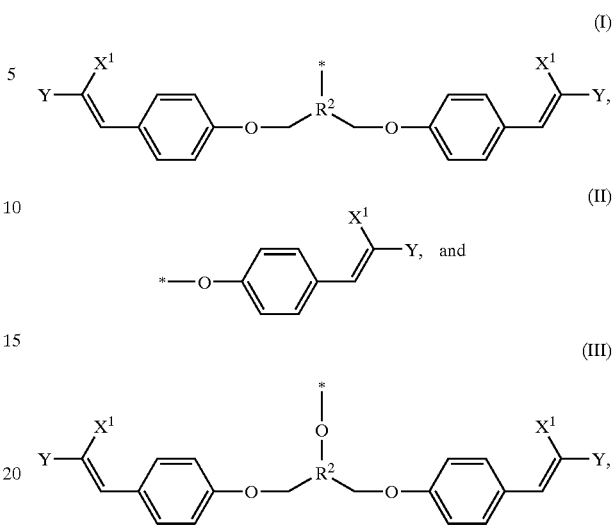

where:

each of $X^1$ and Y is individually selected from the group consisting of electron withdrawing groups;

$R^2$ is selected from the group consisting of alkyls and aryls; and

X is bonded to M through the bond designated by *.

2. The composition of claim 1, said polymer further comprising recurring units having the formula

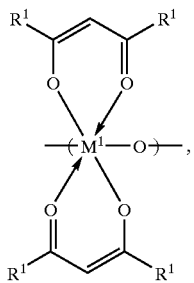

wherein each $R^1$ is individually selected from the group consisting of hydrogen, alkyls, aryls, alkoxys, and phenoxys, and $M^1$ is a metal.

3. The composition of claim 1, wherein M in each recurring unit is a metal individually selected from the group consisting of Ti, Zr, Si, and Al.

4. The composition of claim 1, wherein said composition further comprises a second polymer.

5. The composition of claim 4, wherein said second polymer is selected from the group consisting of epoxy novolac resins, acrylates, polymerized aminoplasts, glycourils, vinyl ethers, and mixtures thereof.

6. The composition of claim 4, wherein said second polymer has a weight average molecular weight of from about 1,000 to about 25,000.

7. The composition of claim 1, wherein one R is —$CH_3$ and the other R is —$OC_2H_5$.

8. The composition of claim 1, wherein each of $X^1$ and Y is individually selected from the group consisting of carbonyls, cyanics, nitrites, sulfones, and —$CO_2R^4$, where $R^4$ is an alkyl.

9. The composition of claim 1, wherein X comprises

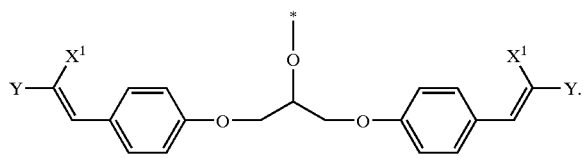

10. The composition of claim 9, wherein X comprises

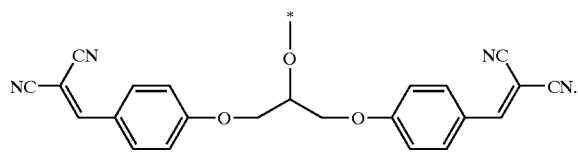

11. An anti-reflective coating composition comprising:
a solvent system; and
a polymer dispersed or dissolved in said solvent system, said polymer being formed by reacting a polymeric metal alkoxide, an organic compound, and a chromophore,
said polymeric metal alkoxide including recurring units having the formula

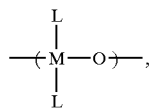

wherein M is a metal, and each L is individually selected from the group consisting of diketo and alkoxide ligands;
said organic compound comprising a functional group for coordinating with M of said polymeric metal alkoxide; and
said chromophore being selected from the group consisting of

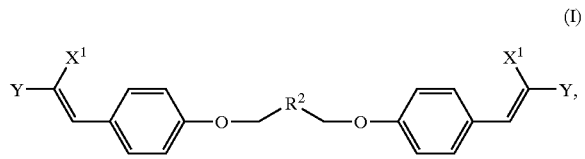

(I)

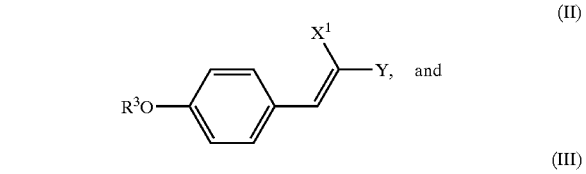

(II)

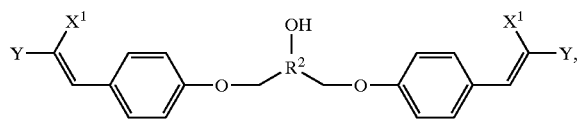

(III)

where:
each of $X^1$ and Y is individually selected from the group consisting of electron withdrawing groups;
$R^2$ is selected from the group consisting of alkyls and aryls; and
$R^3$ is selected from the group consisting of hydrogen and alkyls.

12. The composition of claim 11, wherein M in each recurring unit is a metal individually selected from the group consisting of Ti, Zr, Si, and Al.

13. The composition of claim 11, wherein said composition further comprises a second polymer.

14. The composition of claim 13, wherein said second polymer is selected from the group consisting of epoxy novolac resins, acrylates, polymerized aminoplasts, glycourals, vinyl ethers, and mixtures thereof.

15. The composition of claim 14, wherein said second polymer has a weight average molecular weight of from about 1,000 to about 25,000.

16. The composition of claim 11, wherein each L individually has the formula

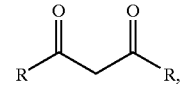

wherein each R is individually selected from the group consisting of hydrogen, alkyls, aryls, alkoxys, and phenoxys.

17. The composition of claim 16, wherein at least one L is a moiety of ethyl acetoacetate.

18. The composition of claim 16, wherein one R is —$CH_3$ and the other R is —$OC_2H_5$.

19. The composition of claim 11, wherein said functional group is selected from the group consisting of alcohol, phenol, and carbonyl groups.

20. The composition of claim 19, wherein said organic compound is selected from the group consisting of trimethylol ethoxylate, 4-hydroxybenzaldehyde, and 2-cyano-3-(4-hydroxyphenyl)-acrylic acid ethyl ester.

21. The composition of claim 11, wherein X comprises

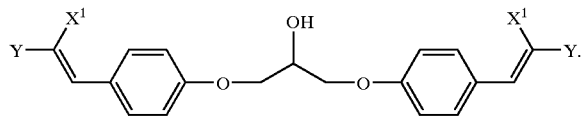

22. The composition of claim 21, wherein X comprises

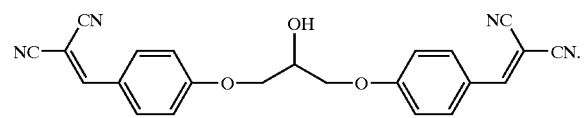

23. A method of using a composition in photolithographic processes, said method comprising the step of applying a quantity of a composition to a substrate to form a layer thereon, said composition comprising:

a solvent system; and
a polymer dispersed or dissolved in said solvent system, said polymer including recurring units having the formula

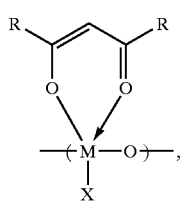

wherein:
M is a metal;
each R is individually selected from the group consisting of hydrogen, alkyls, aryls, alkoxys, and phenoxys; and
X is selected from the group consisting of

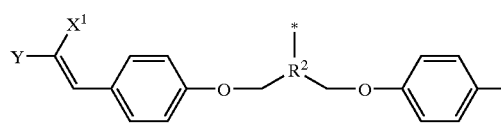
(I)

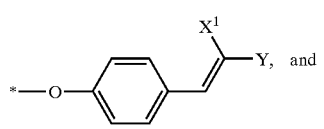
(II)

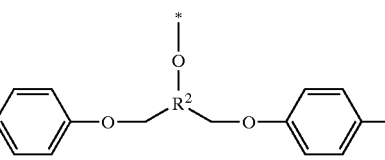
(III)

where:
each of $X^1$ and Y is individually selected from the group consisting of electron withdrawing groups;
$R^2$ is selected from the group consisting of alkyls and aryls; and
X is bonded to M through the bond designated by *.

24. The method of claim 23, wherein said applying step comprises spin-coating said composition onto said substrate surface.

25. The method of claim 23, wherein said substrate has a hole formed therein, said hole being defined by a bottom wall and sidewalls, and said applying step comprises applying said composition to at least a portion of said bottom wall and sidewalls.

26. The method of claim 23, further including the step of baking said layer, after said applying step, at a temperature of from about 100–250° C. to yield a cured layer.

27. The method of claim 26, further including the step of applying a photoresist to said baked layer.

28. The method of claim 27, furthering including the steps of:
exposing at least a portion of said photoresist to activating radiation; and
developing said exposed photoresist.

29. The method of claim 28, wherein said developing step results in the removal of said composition from areas adjacent said exposed photoresist.

30. The method of claim 23, wherein X comprises

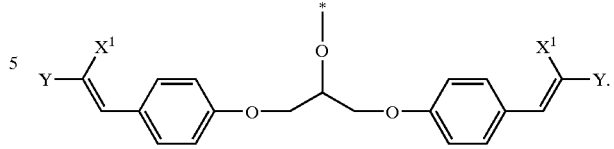

31. The method of claim 30, wherein X comprises

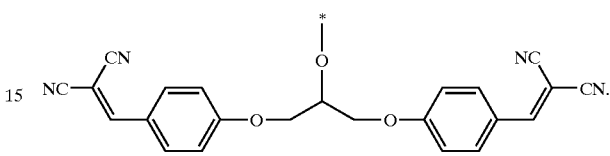

32. A method of using a composition in photolithographic processes, said method comprising the step of applying a quantity of a composition to a substrate to form a layer thereon, said composition comprising:
a solvent system; and
a polymer dispersed or dissolved in said solvent system, said polymer being formed by reacting a polymeric metal alkoxide, an organic compound, and a chromophore,
said polymeric metal alkoxide including recurring units having the formula

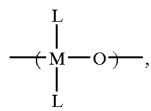

wherein M is a metal, and each L is individually selected from the group consisting of diketo and alkoxide ligands;
said organic compound comprising a functional group for coordinating with M of said polymeric metal alkoxide; and
said chromophore being selected from the group consisting of

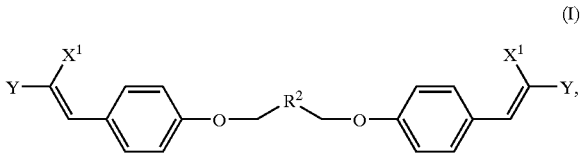
(I)

(II)

(III)

where:
each of $X^1$ and Y is individually selected from the group consisting of electron withdrawing groups;
$R^2$ is selected from the group consisting of alkyls and aryls; and R³ is selected from the group consisting of hydrogen and alkyls.

33. The method of claim 32, wherein said applying step comprises spin-coating said composition onto said substrate surface.

34. The method of claim 32, wherein said substrate has a hole formed therein, said hole being defined by a bottom wall and sidewalls, and said applying step comprises applying said composition to at least a portion of said bottom wall and sidewalls.

35. The method of claim 32, further including the step of baking said layer, after said applying step, at a temperature of from about 100–250° C. to yield a cured layer.

36. The method of claim 35, further including the step of applying a photoresist to said baked layer.

37. The method of claim 36, furthering including the steps of:
  exposing at least a portion of said photoresist to activating radiation; and
  developing said exposed photoresist.

38. The method of claim 37, wherein said developing step results in the removal of said composition from areas adjacent said exposed photoresist.

39. The method of claim 32, wherein X comprises

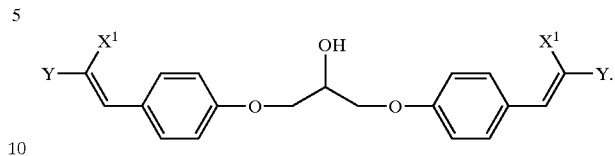

40. The method of claim 39, wherein X comprises

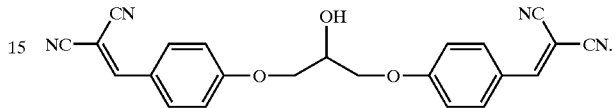

* * * * *